(No Model.) 2 Sheets—Sheet 1.
L. K. FULLER.
ELECTRIC MOTOR ATTACHMENT FOR REED ORGANS.
No. 444,169. Patented Jan. 6, 1891.
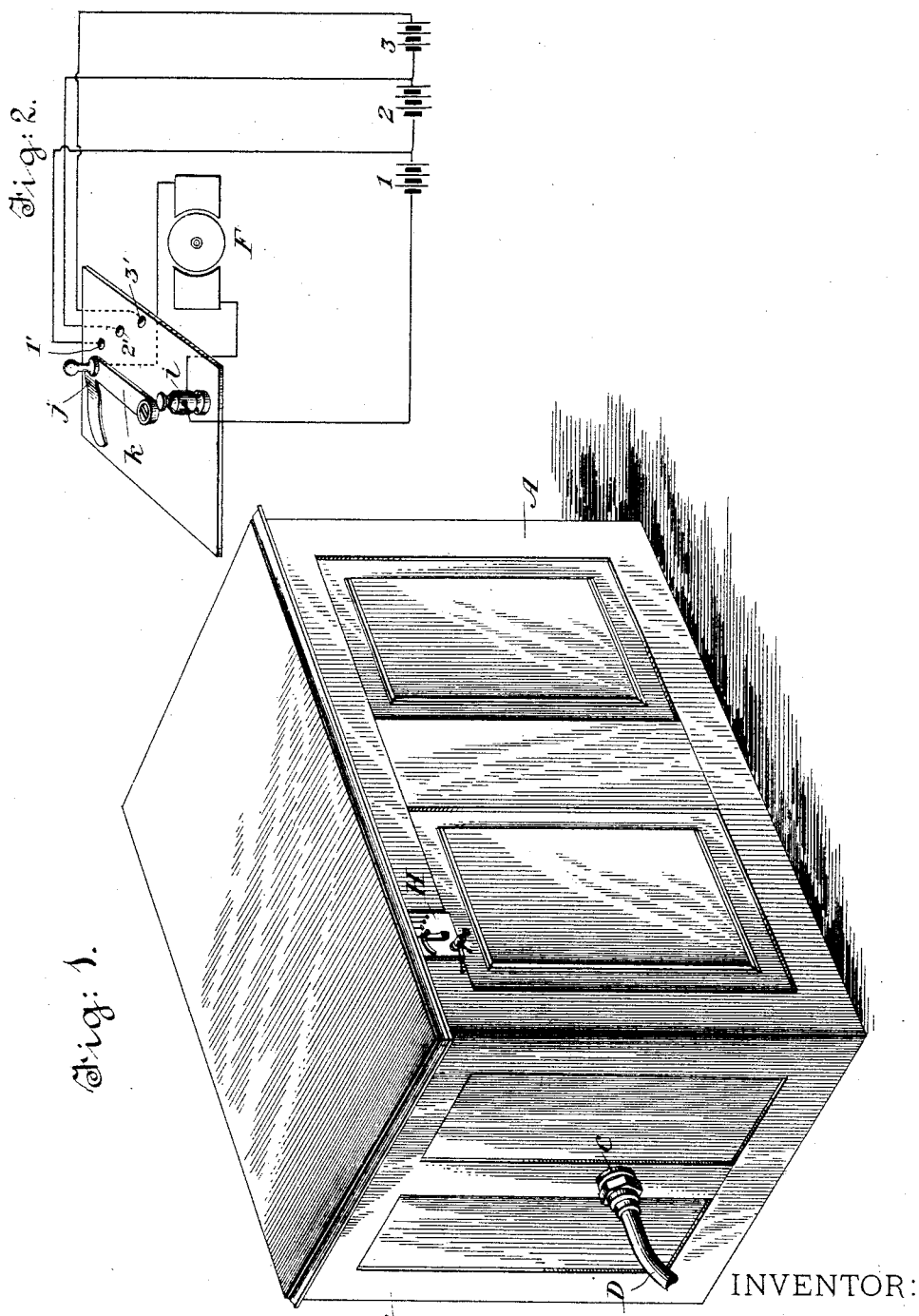
WITNESSES:
INVENTOR:
Lew K. Fuller,
By J. Henry Connell
Attorney.

(No Model.) 2 Sheets—Sheet 2.
L. K. FULLER.
ELECTRIC MOTOR ATTACHMENT FOR REED ORGANS.
No. 444,169. Patented Jan. 6, 1891.
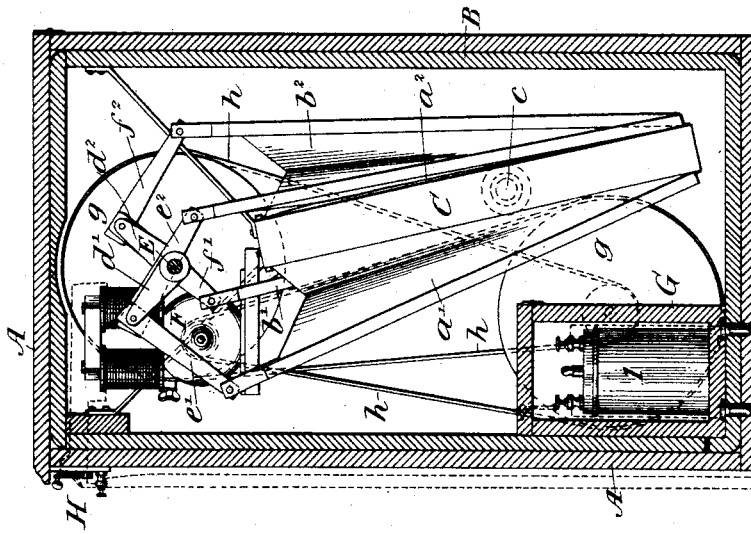
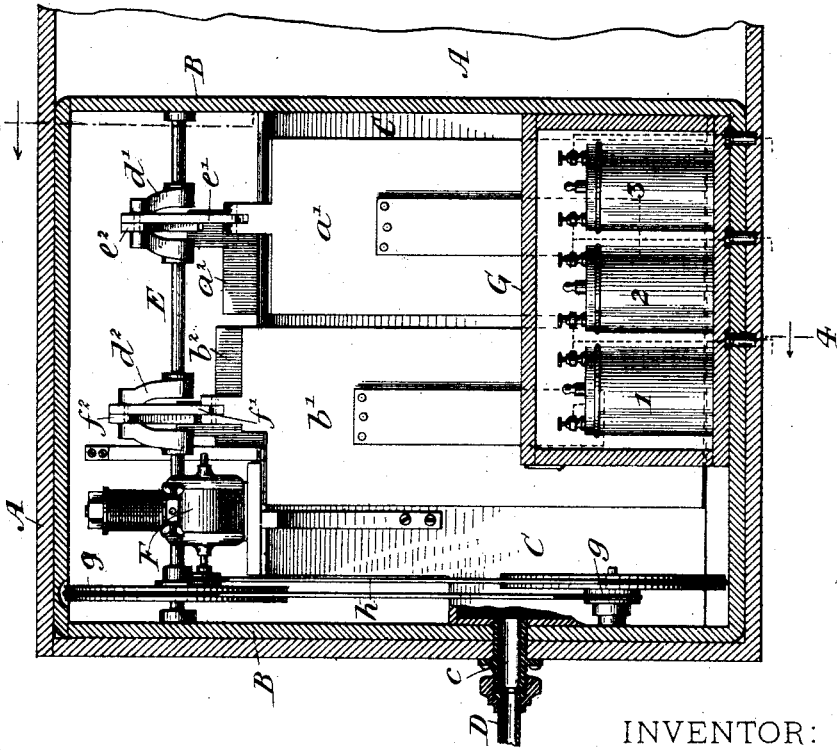
WITNESSES:
INVENTOR:
Levi K. Fuller,
By Henry Bennett
Attorney.

UNITED STATES PATENT OFFICE.

LEVI K. FULLER, OF BRATTLEBOROUGH, VERMONT, ASSIGNOR TO THE ESTEY ORGAN COMPANY, OF SAME PLACE.

ELECTRIC-MOTOR ATTACHMENT FOR REED-ORGANS.

SPECIFICATION forming part of Letters Patent No. 444,169, dated January 6, 1891.

Application filed July 19, 1889. Serial No. 318,077. (No model.)

*To all whom it may concern:*

Be it known that I, LEVI K. FULLER, a citizen of the United States, residing at Brattleborough, in the county of Windham and State of Vermont, have invented certain Improvements in Electric-Motor Attachments for Organs, of which the following is a specification.

This invention relates to improvements in means for actuating the bellows or pumpers of organs by means of an electric motor.

The invention will be fully described hereinafter, and its novel features carefully defined in the claim.

In the accompanying drawings, which serve to illustrate my invention, Figure 1 is a perspective view of the casing inclosing the bellows and motor. Fig. 2 is a somewhat diagraphic view showing the motor and switch-plate. Fig. 3 is a longitudinal vertical section of the casing, showing the interior mechanism in elevation; and Fig. 4 is a transverse vertical section of the same, taken substantially in the plane indicated by the line 4 4 in Fig. 3.

A is the inclosing casing, which may be utilized as a seat for the organist, and B is an inner frame, which provides a support and bearings for the inclosed mechanism.

C is the chest or air-receiver of the bellows, fixed in the casing and communicating with the wind-chest of the organ through the medium of a pipe D, which is connected with a nipple $c$.

E is a shaft within the casing, which is driven from an electric motor F of any kind. As the rotary velocity of the motor will be too great to allow it to be geared directly to the shaft E, I employ intermediate reducing-gear comprising the sheaves or pulleys $g$ and belts $h$. The electrical energy may be supplied to the motor from any generator, as from a dynamo, storage-batteries, &c.

In the drawings I have shown a generator comprising three cells 1 2 3, arranged within the casing A. The entire force of the generator may be used, or only a portion thereof, and this may be controlled by a switch H of any known kind. In Fig. 2 I have shown a switch suitable for this purpose. In this figure, $i$ is a binding-post on the switch-board, through which conductors lead, respectively, from like poles of the cells of the generator to the motor F. From the other poles of said cells conductors lead, respectively, to the terminal contacts 1' 2' 3' on the switch-board. A switch-lever $k$, mounted on said board, is provided at its free end with a contact-plate $j$, which may be put in contact with one or more of said terminal contacts. From this plate $j$ a conductor leads to the motor. By means of this switch one or more of the battery-cells may be put in circuit with the motor F, as desired.

I will now describe the pumpers of the bellows and the intermediate mechanism whereby said pumpers are actuated from the motor-shaft E.

$a'$ and $a^2$ are two pumpers arranged on opposite sides of the receiver C, and $b'$ and $b^2$ represent a pair of similar pumpers arranged in the same manner beside the first-named pair. In the power-shaft C are two cranks $d'$ and $d^2$, which are set at right angles to each other. The ends of the pumpers $a'$ and $a^2$ are coupled, respectively, to the crank $d'$ by links $e'$ and $e^2$, and the pumpers $b'$ and $b^2$ are coupled to crank $d^2$ in a similar manner by links $f'$ and $f^2$. This mechanism produces expansion and contraction of the pumpers when the shaft E revolves in such a manner that the pumpers expand successively one after the other, whereby a constant and regular withdrawal of air from the wind-chest of the organ is effected.

Having thus described my invention, I wish it to be understood that I do not limit myself to any particular kind of generator, nor to any particular kind of motor, nor do I claim those herein shown; but what I do claim is—

The combination, with the inclosing casing A, adapted to serve as a seat for the organist, and the frame B, fitting into the same, of the fixed air-receiver C, mounted in the same and having a nipple $c$, which projects through the outer casing, the pumpers mounted in pairs on said receiver and coupled to cranks in the shaft E, the said shaft rotatively mounted in the frame B, an electric motor within the casing A, the intermediate speed-reducing gearing through which the motor drives shaft E, an electrical generator and circuit, and means, substantially as described, mounted on the casing A, whereby the player may regulate the force of the electric current at will, as set forth.

In witness whereof I have hereunto signed my name in the presence of two subscribing witnesses.

LEVI K. FULLER.

Witnesses:
WALTER H. CHILDS,
J. EDWARD HALL.